United States Patent Office.

CALEB G. COLLINS, OF NEW YORK, N. Y., ASSIGNOR TO CALVIN AMORY STEVENS, OF SAME PLACE.

PROCESS OF MAKING PAINT.

SPECIFICATION forming part of Letters Patent No. 666,262, dated January 22, 1901.

Application filed May 10, 1897. Serial No. 635,902. (No specimens.)

*To all whom it may concern:*

Be it known that I, CALEB G. COLLINS, a citizen of the United States, residing at New York, (Woodsburg,) in the county of Queens and State of New York, have invented certain new and useful Improvements in Processes of Making Paints, of which the following is a specification, sufficient to enable others skilled in the art to which the invention appertains to make and use the same.

The object of my invention is to insure a more intimate and positive union between soluble coloring-matter, such as coal-tar or anilin dyes, and the body with which they are united to form a paint, so as to obtain greater permanence and durability of color.

The invention consists in uniting a coloring-matter in a stated solution to barium sulfate under freshly-generated conditions induced by an electrical current.

Coal-tar or vegetable colors may be permanently and positively united to barium sulfate by my process, in which case the barium sulfate is deposited from a liquid, together with the coloring-matter, by electrolysis, the electrolytic current producing a finely-subdivided absorbent condition of the precipitate, in which the coloring-matter and barium sulfate combine. The insoluble barium sulfate is precipitated by electric dissociation to form a paint body simultaneously with the regeneration of the coal-tar salt or dye.

As an illustration of the manner in which my process can be carried out, I take an aqueous solution of barium dithionate, $(BaS_2O_6-2H_2O,)$ add anilin salt capable of electrolytical dissociation to the solution, and then mix the solutions and subject them to the action of an electric current, when insoluble barium sulfate in a freshly-generated state and in a condition of extreme subdivision will be generated and at the same instant the anilin-salt dye will be electrolytically dissociated, when the circulating ions will recombine and unite with the precipitated barium salt and fall to the bottom of the vessel as an insoluble fine powder having the color of the coal-tar or anilin dye which was before in solution. It is obvious that the finely-subdivided barium sulfate precipitated by electrolytic action becomes thoroughly saturated in its minute particles as it is freshly generated and is more thoroughly impregnated with the color than would be possible by rapid chemical precipitation.

The permanence and durability of paints produced by this process render the invention of importance and utility in a commercial sense.

It is to be understood that I do not confine myself to the use of any particular combination of dye with the barium sulfate so long as it is capable of electrolytical dissociation, as it may be varied indefinitely without departing from the spirit and intent of my invention.

The coloring solution may be made strong as compared with the amount of barium sulfate to be deposited therein, thus affording a highly-concentrated pigment for mixture with other vehicles or paints, or the vehicle may be combined in such proportion with the coloring-matter as to constitute a paint for actual use. In either case the color is fixed and permanent.

I am aware that insoluble oxids have been produced on the surface of an anode by the action of free oxygen liberated by electrolysis at that point on the same and that various dyes have been introduced into the liquid surrounding said anode for the purpose of coloring the oxid thus chemically produced by secondary reaction. It can be readily seen, however, that the production of such oxid upon the anode is purely superficial and cannot be carried on to any considerable extent, as the superficial coating of oxid eventually prevents further action and naturally cannot be considered a commercial process. In my process the metallic oxid or paint body is not produced by secondary chemical action upon the metallic anode, but the metallic base in soluble combination is actually in solution and the insoluble metallic compound or paint body is thrown down from its solution containing the dyes in a finely-comminuted condition by dissociation, withdrawal, or abstraction of elements of the compound, allowing the product which is insoluble to be thrown out of the solution, in which condition it rapidly absorbs the dyes or color. I am also aware that processes have been devised whereby the paint base or body is derived wholly from the electrodes by corroding, dissolving, or otherwise transforming the same into a soluble compound, and naturally disintegrating and destroying the same, thereby requiring substitution of new electrodes from time to time. The electrodes being of more or less expensive character and their decomposition being slow and tedious, it is obvious that processes dependent upon this source of supply or generation of paint body could not be employed practically in a commercial sense.

It is obvious that my process can be carried on continuously without material deterioration of either anode or cathode, the chemicals to be dissociated being added from time to time as the paint body and color are precipitated and the products of dissociation withdrawn. The dye is also added from time to time to strengthen the depleted solution, thereby maintaining a uniformly-colored precipitate.

It will be readily seen that in the production of paint bodies from soluble salts by my process as hereinbefore set forth it would be impracticable to employ an anode from which the solution could be regenerated by corroding, dissolving, or otherwise transforming the same into a soluble compound, for the reason that metallic barium could not thus be employed.

What I claim as my invention, and desire to secure by Letters Patent, is—

1. The process of making pigments which consists in producing a solution of barium dithionate, introducing into the same a dye salt, passing an electric current therethrough thereby subjecting said mixture to electrolytic dissociation, and precipitating barium sulfate together with the dye salt substantially as described.

2. The process of making pigments which consists in passing an electric current through a solution containing a dye salt and compound from which barium sulfate may be precipitated by electrolysis, whereby barium sulfate containing the dye is precipitated.

CALEB G. COLLINS.

Witnesses:
D. W. GARDNER,
GEO. WM. MIATT.